United States Patent Office 3,455,923
Patented July 15, 1969

3,455,923
MANUFACTURE OF CYCLOPROPYL COMPOUNDS
Renat Herbert Mizzoni, Long Valley, Robert Armistead Lucas, Mendham, and George de Stevens, Woodland Park, Summit, N.J., assignors to Ciba Corporation, New York, N.Y., a corporation of Delaware
No Drawing. Filed June 23, 1966, Ser. No. 559,717
Int. Cl. C07d 51/42
U.S. Cl. 260—256.4      5 Claims

ABSTRACT OF THE DISCLOSURE 2-cycloaliphatyl-3-amino-pyrimidines, e.g. those of the formula

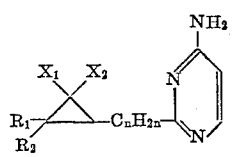

$X_1$=halogen
$X_2$=H or halogen
$R_{1,2}$=H or alkyl
$R_3$=CN, $CH_2NH_2$ or free, etherified or esterified $CH_2OH$
$n$=0–7 are valuable intermediates in the preparation of corresponding quaternary 5-ammoniummethyl-4-amino-2-cy-cyloaliphatyl-pyrimidine salts with coccidiostatic effects.

---

The present invention concerns and has for its object a new process for the preparation of compounds having the Formula I

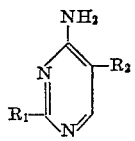

in which $R_1$ stands for cyclopropyl, cyclopropenyl, cyclopropyl-lower alkyl, cyclopropenyl-lower alkyl or those radicals containing one or two lower alkyl groups or halogen atoms attached to one ring-carbon atom thereof, and $R_2$ for cyano, aminomethyl or a free, esterified or etherified hydroxymethyl group. These compounds are valuable intermediates in the preparation of corresponding quaternary 5-ammoniummethyl-4-amino-2-$R_1$-pyrimidine salts having antiprotozoal, especially coccidiostatic, effects; they are described in copending application Ser. No. 534,666, filed Mar. 16, 1966.

The process of this invention consists in:

(a) reacting a lower alkenoic acid derivative with an esterified or etherified hydroxymethyl metal compound.
(b) converting the cyclopropyl-carboxylic or -lower alkanoic acid derivative obtained into the corresponding amidine,
(c) reacting the amidine obtained with an etherified α-hydroxy-methylene-malonodinitrile or β-hydroxy-propionitrile,
(d) if desired, dehalogenating or dehydrohalogenating any halo-cyclopropyl compound obtained at any stage and/or
(e) converting in any resulting compound a cyano group present into aminomethyl or an esterified or etherified hydroxymethyl group.

One specific and preferred performance of said process may be depicted as follows:

(a)
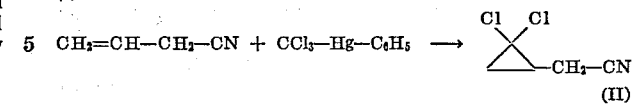

(b)
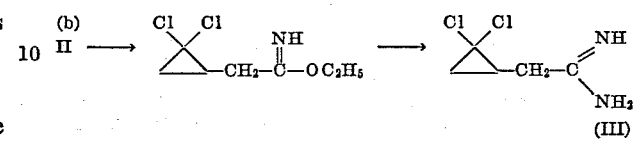

(c)
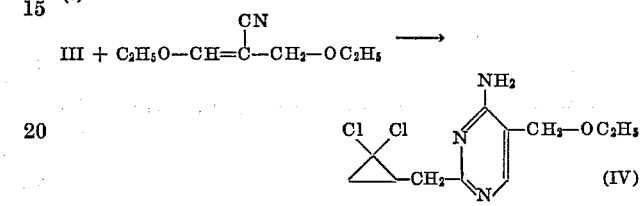

(d)
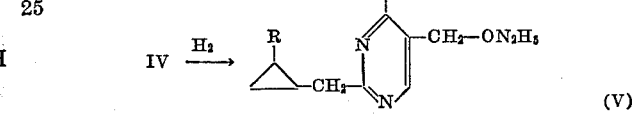

or (c)
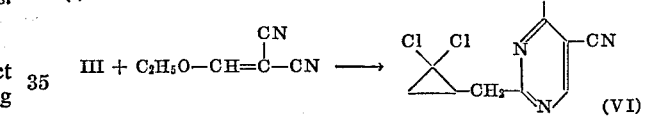

(d'+e')
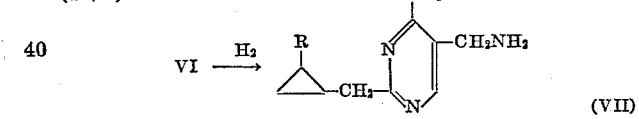

(e'')
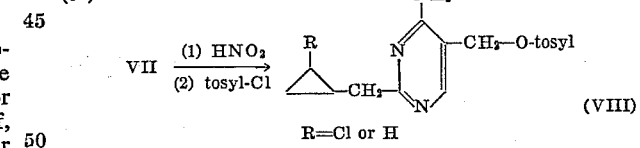

R=Cl or H

The lower alkenoic acid derivative used in step (a) is preferably the nitrile, but may also be the amide or an ester, for example, a lower alkyl ester. Said derivatives are preferably those of acids which contain the double bond between the β,γ-position, such as 3-butenoic, 2- or 3-methyl-3-butenoic, 3-pentenoic, 2- or 4-methyl-3-pentenoic, 2,2-dimethyl-3-pentenoic, 3-hexenoic or 3-heptenoic acid.

The esterified or etherified hydroxymethyl metal compound is, for example, a lower alkoxymethyl-Grignard compound or preferably a halomethyl metal compound, advantageously derived from a metal of the second B group, but also of the fourth A group of the Periodic Table, such as zinc or advantageously mercury, but also, for example, silicon or tin. The halomethyl group bound to one valence of said metal is a mono-, di- or preferably a trihalomethyl group such as chloromethyl, bromomethyl, iodomethyl, chloroiodomethyl, trifluoromethyl, trichloromethyl, tribromomethyl, fluoro-dichloromethyl, chloro-dibromomethyl or dichloro-bromomethyl. The group bound to the remaining valences of the metal is of minor significance, it may be a hydrocarbon radical, such as lower alkyl or advantageously carbocyclic aryl, e.g. methyl, ethyl or especially phenyl, halogen or the above halomethyl groups.

The formation of the amidines according to step (b) may be carried out in the usual manner, depending on the intermediate chosen, for example, starting from an ester via amides, starting from an amide via iminohalogenides, starting from the nitrile via imino esters, by addition of ammonia or alkaliamides to the nitrile or preferably by ammonolysis of imino esters or halogenides.

The etherified α-hydroxymethylene-malonodinitrile or -β-hydroxy-propionitrile used in step (c) is preferably an α-lower alkoxymethylene-malonodinitrile or α-lower alkoxy-methylene-β-lower alkoxy-propionitrile, advantageously the corresponding methoxy or ethoxy compounds.

Any compound obtained, that contains halogen attached to the cyclopropyl moiety, may either reductively be dehalogenated, for example with the use of catalytically activated or nascent hydrogen, e.g. hydrogen in the presence of Raney nickel, platinum or palladium, or hydrogen generated by the action of metals on acids or alcohols or by electrolysis, in order to obtain partially or totally dehalogenated products. They may also be dehydrohalogenated with the use of bases, e.g. alkalimetal hydroxides, carbonates, bicarbonates or lower alkoxides, or tertiary nitrogen bases, such as triethylamine or pyridine, in order to obtain cyclopropenyl compounds.

The conversion of the 5-cyano group may be performed according to methods known per se. For example, said group may be converted into aminomethyl by catalytic hydrogenation, the latter group then into hydroxymethyl, for example, with the use of nitrous acid, and the hydroxymethyl group may then be esterified or etherified in the usual manner in order to obtain esters, for example, those of a hydrohalic, sulfuric, sulfonic or carbamic acid, e.g. hydrochloric, hydrobromic, sulfuric or lower alkyl sulfuric acid, a lower alkane or benzene sulfonic acid, e.g. methane, ethane, benzene or p-toluene sulfonic acid, or unsubstituted or N-substituted carbamic acid, e.g. N,N-dimethyl or N-phenyl-carbamic acid, or to obtain ethers, for example, lower alkyl or phenyl-lower alkyl ethers, e.g. the methyl, ethyl, isopropyl or benzyl ether.

The resulting compounds or intermediates are obtained or used in the free form or in the form of their acid addition salts, depending on the conditions under which the process is carried out; these salts are also included in the present invention. Acid addition salts that are obtained can be converted into the free compounds in known manner, for example, with alkalies, e.g. alkali metal hydroxides, carbonates or bicarbonates, or into other salts, for example with ion exchangers. Free compounds that are obtained can be converted into acid addition salts by reacting them with inorganic or organic acids or ion exchangers.

The above reactions are carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

The invention further includes any variant of the present process in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts. For example, as indicated in the formula scheme, steps (d) and (e) may be carried out in a single operation or step (d) may follow step (b). Mainly those starting materials should be used in the reactions of the invention that have been indicated above as being especially valuable or advantageous respectively.

The present invention also comprises the new intermediates formed in this process, more particularly compounds of the Formula IX

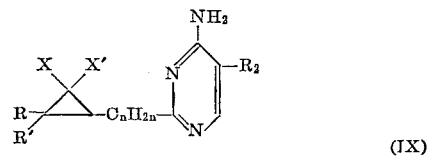

(IX)

in which each of R and R' stands for hydrogen or lower alkyl, X for halogen, X' for hydrogen or halogen, $n$ for an integer from 0 to 7 and $R_2$ has the meaning given above, especially those of Formulae IV and VI, and salts thereof.

The starting materials are known, or if they are new, may be prepared by methods in themselves known.

The following example is intended to illustrate the invention and is not to be construed as being a limitation thereon. Temperatures are given in degrees centigrade and all parts wherever given are parts by weight.

Example 1

The stirred mixture of 35.64 g. phenyl - (trichloromethyl)-mercury, 21 ml. allylcyanide and 100 ml. dry benzene is refluxed for 137 hours under nitrogen. At this time the mercury compound is completely used up. The mixture is filtered, the filtrate evaporated in vacuo and the residue triturated with diethyl ether. The precipitate formed is filtered off, the residue washed with diethyl ether, the filtrate evaporated in vacuo, the residue distilled and the fraction boiling at 100–107°/11 mm. Hg collected; it represents the 2,2-dichloro-cyclopropyl-acetonitrile.

15.0 g. thereof are dissolved in 60 ml. anhydrous ethanol and through the cooled solution hydrogen chloride is bubbled until 3.7 g. thereof are consumed. After standing overnight in the refrigerator the precipitate formed is filtered off, washed with diethyl ether and dried to yield the 2,2-dichloro-cyclo-propyl-acetimidic acid ethyl ester hydrochloride.

97.5 g. thereof are suspended in 75 ml. anhydrous ethanol and 100 ml. 6.3 N ethanolic ammonia are added rapidly while stirring and cooling. The reaction mixture is allowed to stand at room temperature overnight. It is filtered, the filtrate evaporated and the residue recrystallized from ethanol to yield the 2,2-dichloro-cyclopropyl-acetic acid amidine hydrochloride.

68.5 g. thereof are dissolved in 350 ml. anhydrous ethanol and the solution combined with that prepared from 2.4 g. sodium and 95 ml. anhydrous ethanol. The mixture obtained is stirred for ½ hour at room temperature, then filtered through a glass funnel and the filtrate added dropwise to the solution of 13.0 g. ethoxymethylidene-malonodinitrile in 13 ml. anhydrous ethanol while keeping the temperature below −5°. The mixture is stirred for 3 hours at this temperature, then filtered, the residue washed with a little cold ethanol and dried in vacuo to yield the 5-cyano-4-amino-2-(2,2-dichloro-cyclopropylmethyl)-pyrimidine.

15.0 g. thereof are hydrogenated in 100 ml. 2 N ethanolic ammonia over 15.0 g. Raney nickel for 2 days at 47 p.s.i. and room temperature. The mixture is then filtered, the filtrate evaporated and the residue acidified with ethanolic hydrochloric acid. The precipitate formed is filtered off to yield the 5-aminomethyl-4-amino-2-(2-chloro-propylmethyl)-pyrimidine dihydrochloride.

The solution of 8.6 g. thereof in 115 ml. water is heated to 55° and the solution of 2.3 g. sodium nitrite in 100 ml. water is added dropwise while stirring. The mixture is kept at this temperature for 6 hours and stirred overnight at room temperature. Hereupon it is treated with charcoal, filtered and the filtrate concentrated to about 50 ml. in vacuo. The concentrate is cooled, neutralized with saturated aqueous sodium carbonate and extracted with n-butanol. The extract is dried and evaporated in vacuo. The residue is triturated with diethyl ether and the precipitate formed filtered off to yield the 5-hydroxymethyl - 4 - amino - 2 - (2 - chloro-cyclopropylmethyl)-pyrimidine of the formula

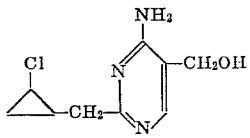

What is claimed is:
1. Compounds of the formula

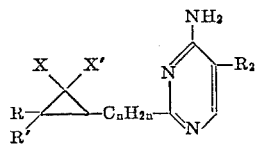

in which each of R and R' stands for a member selected from the group consisting of hydrogen and lower alkyl, X for halogen, X' for a member selected from the group consisting of hydrogen and halogen, $n$ for an integer from 0 to 7 and $R_2$ for a member selected from the group consisting of cyano, aminomethyl, hydroxymethyl, lower alkoxymethyl, phenyl-lower alkoxymethyl, halomethyl, lower alkoxysulfonyloxy-methyl, lower alkanesulfonyloxymethyl, benzenesulfonyloxymethyl and tosyloxymethyl.

2. A compound as claimed in claim 1 and being the 5 - hydroxymethyl - 4 - amino - 2 - (2 - chlorocyclopropylmethyl)-pyrimidine.

3. A compound as claimed in claim 1 and being the 5-hydroxymethyl - 4 - amino - 2 - (2 - chloro-cyclopropylmethyl)-pyrimidine tosylate.

4. A compound as claimed in claim 1 and being the 5-ethoxymethyl - 4 - amino - 2 - (2,2-dichloro-cyclopropylmethyl)-pyrimidine.

5. A compound as claimed in claim 1 and being the 5-cyano - 4 - amino - 2 - (2,2-dichloro-cyclopropylmethyl)-pyrimidine.

References Cited

Brown: The Pyrimidines, Interscience, 1962, pp. 31–2, 61–4, 67.

ALEX MAZEL, Primary Examiner

R. J. GALLAGHER, Assistant Examiner

U.S. Cl. X.R.

260—256.5, 464, 465.6, 564, 566, 999